3,207,779
SUBSTITUTED 5-INDANCARBOXYLIC ACIDS
AND ESTERS
Royal A. Cutler, Sand Lake, N.Y., and Johannes S. Buck, deceased, late of Albany, N.Y., by Phillis G. Buck, executrix, Ridgewood, N.J., assignors to Sterling Drug Inc., New York, N.Y., a corporation of Delaware
No Drawing. Filed June 30, 1961, Ser. No. 121,256
10 Claims. (Cl. 260—473)

This invention relates to new and useful indanol-carboxylic acid compounds and to methods for their preparation.

It is known that certain synthetic organic compounds have the property of increasing the output of bile by the liver. Such compounds, termed choleretics in the are, find utility in the treatment of a variety of pathological conditions of the gall bladder and the bile ducts, for example, cholecystitis and cholangitis.

A principal object of the instant invention is to provide new and useful choleretic agents.

The novel indanol-carboxylic acid compounds provided by this invention are 4-hydroxy-7-X-5-indancarboxylic acids and esters thereof, and the derivatives thereof wherein the hydrogen of the 4-hydroxyl group is replaced by a member of the group consisting of lower-alkyl and lower-alkanoyl radicals, and wherein X is a member of the group consisting of hydrogen and halogen.

In the form of the free acids, the subject compounds have the general formula

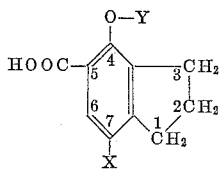

Formula I wherein Y is a member of the group consisting of hydrogen, lower-alkyl and lower-alkanoyl and X is as defined above.

In the form of the esters, the subject compounds have the general formula

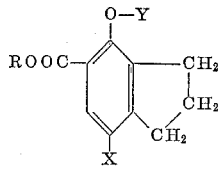

Formula II wherein R is lower-alkyl and Y and X are as defined above.

In Formula II, R is lower-alkyl, that is, it is a straight- or branched-chain saturated aliphatic radical having from one to six carbon atoms, for example methyl, ethyl, n-propyl, isopropyl, n-butyl, isobutyl, tert-butyl, n-amyl, n-hexyl, and the like.

In the above formulas, when Y is lower-alkyl it is as defined above for R. When Y is lower-alkanoyl, it is an aliphatic carboxylic acyl radical having from one to seven carbon atoms, for example, formyl, acetyl, propionyl, butyryl, isobutyryl, valeryl, caproyl, and the like.

In the above formaul, when X is halogen, it is, for example, chlorine, bromine or iodine.

The free acid forms of the compounds of the instant invention react with organic and inorganic bases to produce organic and inorganic salt forms. The preferred salts are those which are water-soluble and which have pharmacologically-acceptable cations. However, all salt forms, including those which are insoluble and those having cations which are not physiologically acceptable are useful in purification procedures, as means for identification of the corresponding acids, and as sources of the corresponding free acids and hence also of the preferred, pharmacologically-acceptable salts. Representative examples of the salts are those wherein the acidic hydrogens in the acids of the above formulas are replaced by one equivalent of a cation of an alkali metal, for example, sodium, potassium and lithium, an alkaline earth, for example, barium, magnesium, calcium, and strontium, and other metal ions, for example, zinc, iron, copper, silver, lead, cobalt, aluminum, and the like. Non-metallic cations include for example, the ammonium ion ($NH_4$) and substituted, organic ammonium ions derived from primary, secondary and tertiary amines, and quaternary ammonium ions.

The 4-hydroxy-5-indancarboxylic acids of this invention, in addition to being useful as choleretic agents, have utility as intermediates for the preparation of the various derivatives shown generically in the above formulas. The 4-hydroxy-5-indancarboxylic acids can be conveniently prepared by reacting 4-hydroxyindan, optionally substituted in the 7-position by a halogen atom, with carbon dioxide in the presence of an alkali metal carbonate, for example potassium carbonate. The reaction is preferably carried out in an autoclave at 1200 to 3500 p.s.i. pressure and at a temperature of about 150–200° C. Under these conditions, excellent yields of potassium 4-hydroxy-5-indancarboxylate are obtained.

It will be understood that the process employed in this invention involves a novel application of the Kolbe-Schmitt synthesis. Various modifications of the procedural conditions required in the Kolbe-Schmitt reaction are well known and will be obvious to those skilled in the art.

An alternative procedure for preparing the 4-hydroxy-5-indancarboxylic acids involves heating the corresponding 4-hydroxyindan with an alkali metal salt of a monoester of carbonic acid, for example potassium ethyl carbonate or sodium methyl carbonate. By the use of this reaction, autoclaving is obviated.

In the above formulas, when X is halogen, it is convenient to prepare the intermediate 7-halo-4-hydroxyindan by reacting 4-hydroxyindan with a halogenating agent for example, sulfuryl chloride, chlorine, bromine or iodine, in the presence of a suitable catalyst, for example, a ferric halide or a crystal of iodine. The practical temperature range for the halogenation reaction is between about 20° and about 100° C. Although a solvent is not always needed, as, for example, in the reaction of 4-hydroxyindan with sulfuryl chloride, a suitable inert solvent may be employed. Examples of such inert solvents are acetic acid, chloroform, carbon disulfide, and the like.

Alternatively, the 7-halo-4-hydroxy-5-indancarboxylic acids can be prepared by reacting 4-hydroxy-5-indancarboxylic acid with the above-mentioned halogenating agents.

The molecular structures of the novel compounds herein disclosed are established by their mode of synthesis and their infra-red spectra and corroborated by the correspondence of calculated and found values for the elementary analyses for representative examples.

The vicinal relationship of the hydroxyl group and the carboxyl group was established by the following data. The O—H stretching absorption band in the infra-red spectrum of a solution of methyl 4-hydroxy-5-indancarboxylate (Example 3 below) in carbon tetrachloride appeared at 3193–3200 cm.$^{-1}$, and no shift in the position of the absorption band occurred upon diluting the solution. These results show that the hydroxyl group of methyl 4-hydroxy-5-indancarboxylic acid produced by the method given hereinbelow is intramolecularly bonded.

The compounds of this invention possess valuable pharmacodynamic properties for example, choleretic, parasitocidal, respiratory stimulant, mild analgesic and pyretic activities and are useful, especially as choleretic agents.

The following examples of the invention are given for the purpose of illustration only, and are not to be construed as limiting the invention in either scope or spirit. It will be obvious to those skilled in the art that various modifications of both reactants and reaction conditions can be employed to produce essentially the same results, and such modifications are considered the full equivalents of the illustrated reactants and reaction conditions given herein.

EXAMPLE 1

*4-hydroxy-5-indancarboxylic acid*

[R, Y and X=H]

A solid-carbon dioxide-chilled autoclave liner was charged with 125 g. (0.931 mole) of 4-hydroxyindan, 375 g. (2.71 moles) of dried potassium carbonate, and about 600 g. (about 13.6 moles) of solid carbon dioxide. The mixture was autoclaved at 175–183° for four hours at a pressure of about 2600 p.s.i. The reaction mixture, which contained solid potassium 4-hydroxy-5-indancarboxylate, was then dissolved in hot water, and the solution was treated with activated charcoal. Upon acidification of the alkaline solution with concentrated hydrochloric acid, with simultaneous external cooling, the solid free acid precipitated. Recrystallization of the product from 4 volumes of 95 percent ethanol gave pure 4-hydroxy-5-indancarboxylic acid, M.P. 202.0–205.0° C. (corr.).

*Analysis.*—Calcd. for $C_{10}H_{10}O_3$: C, 67.39; H, 5.66; O, 26.93. Found: C, 67.11; H, 5.68; O, 26.60.

When administered intravenously to dogs at doses of 20 mg./kg. of body weight, 4-hydroxy-5-indancarboxylic acid increased the flow of bile more than four times over the control volume thirty minutes following administration.

The compound also had parasitocidal activity against for example *Trichomonas gallinae*.

EXAMPLE 2

*4-acetoxy-5-indancarboxylic acid*

[R=H; Y=COCH$_3$; X=H]

4-hydroxy-5-indancarboxylic acid (62. g.; 0.35 mole) was heated on a steam bath for one hour with 124 ml. of acetic anhydride and 3 ml. of concentrated sulfuric acid. On cooling and diluting the resulting solution with an equal volume of water, the white product precipitated. Repeated recrystallization from ethylene dichloride containing a trace of acetic anhydride gave pure 4-acetoxy-5-indancarboxylic acid, M.P. 149.6–152.8° C. (corr.).

*Analysis.*—Calcd. for $C_{12}H_{12}O_4$: C, 64.45; H, 5.50. Found: C, 65.53; H, 5.53. Neutralization equivalent calcd.: 220.2. Found: 218.3.

When administered intravenously to dogs in doses of 20 mg./kg. of body weight, 4-acetoxy-5-indancarboxylic acid increased the flow of bile by more than three times the control volume thirty minutes after administration.

EXAMPLE 3

*Methyl 4-hydroxy-5-indancarboxylate*

[R=CH$_3$; Y and X=H]

4-hydroxy-5-indancarboxylic acid (53 g.; 0.3 mole) was esterified with methyl alcohol in ethylene dichloride by refluxing in the presence of a catalytic quantity of sulfuric acid for 68 hours. After recrystallization from methanol, the pure methyl 4-hydroxy-5-indancarboxylate thus obtained melted at 96.2–98.0° C. (corr.).

*Analysis.*—Calcd. for $C_{11}H_{12}O_3$: C, 68.72; H, 6.30; O, 24.96. Found: C, 68.77; H, 5.96; O, 25.20.

EXAMPLE 4

*4-Methoxy-5-indancarboxylic acid*

[Y=CH$_3$; R and X=H]

A solution containing 43.3 g. (0.24 mole) of 4-hydroxy-5-indancarboxylic acid, 40 g. (0.28 mole) of methyl iodide, and 28 g. (0.50 mole) of potassium hydroxide in 125 ml. of water is refluxed for about twelve hours, whereupon a layer of methyl 4-methoxy-5-indancarboxylate separates. About 150 ml. of 10 percent potassium hydroxide is added and the mixture is refluxed for another three hours or until the solution becomes clear. Acidification of the alkaline solution precipitates the free acid, 4-methoxy-5-indancarboxylic acid.

EXAMPLE 5

*7-chloro-4-hydroxy-5-indancarboxylic acid*

[X=Cl; Y and R=H]

To a solution of 4-hydroxy-5-indancarboxylic acid (5 g.; 0.03 mole) in 60 ml. of acetic acid was added a small crystal of iodine. Sulfuryl chloride (2.4 ml.; 0.3 mole) was added drop-wise while the solution was kept at about 50° C. The iodine color quickly was discharged and a solid separated from the solution. After about four hours the white product was collected and recrystallized from 60 volumes of ethyl acetate. The pure 7-chloro-4-hydroxy-5-indancarboxylic acid melted at 277–279° C.

An alternative procedure for the preparation of 7-chloro-4-hydroxy-5-indancarboxylic acid involves the intermediate preparation of 7-chloro-4-hydroxyindan as follows.

7-chloro-4-hydroxyindan: Sulfuryl chloride (560 g.; 4.2 moles) was added dropwise to melted 4-hydroxyindan (469 g.; 3.5 moles) containing a small crystal of iodine. The temperature was maintained in the range 65–75° C. during and for one hour following addition of the sulfuryl chloride. About 1.5 liters of water was added, and the mixture was stirred and heated at about 75° C. for one-half hour. Cooling the mixture to about 40° C. caused the precipitation of 7-chloro-4-hydroxyindan, which, when recrystallized from hexane, melted at 90–92° C.

7-chloro-4-hydroxy-5-indancarboxylic acid [X=Cl; Y and R=H]: The procedure of Example 1 was followed using 25 g. of 7-chloro-4-hydroxyindan, 62 g. of dry potassium carbonate, and about 140 g. of solid carbon dioxide. The 7-chloro-4-hydroxy-5-indancarboxylic acid, produced by acidification of an aqueous solution of the resulting potassium 7-chloro-4-hydroxy-5-indancarboxylate, was recrystallized from 60 volumes of ethyl acetate as white platelets, M.P. 279.2–280.4° C. (corr.). This product was identical with the 7-chloro-4-hydroxy-5-indancarboxylic acid obtained by the above method.

*Analysis.*—Calcd. for $C_{10}H_9ClO_3$: Cl, 16.68. Found: Cl, 16.95. Neutralization equivalent calcd.: 212.6. Found: 214.

When administered to dogs intravenously in doses of 20 mg./kg. of body weight, 7-chloro-4-hydroxy-5-indancarboxylic acid has been shown to have strong choleretic activity. The compound caused an increase in the rate of bile flow which was greater than that caused by florantyrone, a commercial choleretic agent. In addition, the duration of action of 7-chloro-4-hydroxy-5-indancarboxylic acid has been found to be longer than that of florantyrone.

When administered orally to rats, 7-chloro-4-hydroxy-5-indancarboxylic acid was shown to have mild analgesic activity in the range of aspirin. The compound shows a hyperthermic effect in rats when administered intravenously at doses of 50 mg./kg., and it acts as a respiratory stimulant when administered intravenously to dogs in doses of 16 mg./kg. The intravenous $LD_{50}$ of the compound in rats is 75±4 mg./kg.

There can also be prepared according to procedures given hereinabove the following examples of the invention:

7-bromo-4-hydroxy-5-indancarboxylic acid by reacting 4-hydroxy-5-indancarboxylic acid with bromine, Ethyl 7-iodo-4-hydroxy-5-indancarboxylate by reacting 4-hydroxy-5-indancarboxylic acid with iodine and esterifying the resulting 4-hydroxy-7-iodo-5-indancarboxylic acid with ethyl alcohol, 7-chloro-4-ethoxy-5-indancarboxylic acid by reacting 7-chloro-4-hydroxy-5 - indancarboxylic acid with ethyl bromide, 4-n-hexoxy-5-indancarboxylic acid by reacting 4-hydroxy-5-indancarboxylic acid with n-hexyl bromide, n-Butyl 4-n-butoxy-5-indancarboxylate by reacting 4-hydroxy-5-indancarboxylic acid with excess n-butyl bromide, and omitting the step of saponifying the ester, n-Amyl 4-methoxy-5-indancarboxylate by reacting 4-hydroxy-5-indancarboxylic acid with methyl iodide, saponifying the ester, and esterifying the 4-methoxy-5-indancarboxylic acid thus obtained with n-amyl alcohol, n-Propyl 7-bromo-4-propionoxy-5 - indancarboxylate by esterifying 7-bromo-4-hydroxy-5-indancarboxylic acid (above) with n-propyl alcohol and acylating the resulting n-propyl 7-bromo-4-hydroxy-5-indancarboxylate with propionic anhydride, Sodium 4-valeroxy-5-indancarboxylic by reacting 4-hydroxy-5-indancarboxylic acid with valeric anhydride and neutralizing the resulting 4-valeroxy-5-indancarboxylic acid with sodium hydroxide, 7-iodo-4-isobutyryloxy-5-indancarboxylic acid by reacting 4-hydroxy-7-iodo-5-indancarboxylic acid (above) with isobutyric anhydride, 7-chloro-4-tert-butoxy-5-indancarboxylic acid by reacting 7-chloro-4-hydroxy-5 - indancarboxylic acid with tert-butyl bromide, 3-methyl-3-amyl 4-acetoxy-5-indancarboxylate by reacting 4-acetoxy-5-indancarboxylic acid (above) with 3-methyl-3-amyl alcohol, Isopropyl 7-chloro-4-isopropoxy-5 - indancarboxylate by reacting 7-chloro-4-hydroxy-5-indancarboxylic acid with excess isopropyl bromide, Magnesium 7-bromo-4-hydroxy-5 - indancarboxylate by reacting equivalent quantities of magnesium hydroxide and 7-bromo-4-hydroxy-5-indancarboxylic acid, Calcium 7-chloro-4-ethoxy-5-indancarboxylate by reacting equivalent quantities of calcium hydroxide and 7-chloro-4-ethoxy-5-indancarboxylic acid, Zinc 4-n-hexoxy-5-indancarboxylate by reacting equivalent quantities of zinc hydroxide and 4-n-hexoxy-5-indancarboxylic acid, Cupric 4-valeryloxy-5-indancarboxylate by reacting cupric hydroxide with an equivalent quantity of 4-valeryloxy-5-indancarboxylic acid, Ferric 7-iodo-4-isobutyryloxy-5-indancarboxylate by reacting equivalent quantities of ferric hydroxide and 7-iodo-4-isobutyryloxy-5-indancarboxylic acid, Aluminum 7-chloro-4-tert-butoxy-5-indancarboxylate by reacting equivalent quantities of aluminum hydroxide and 7-chloro-4-tert-butoxy-5-indancarboxylic acid, Ammonium 7-chloro-4-hydroxy-5 - indancarboxylate by reacting equivalent quantities of ammonium hydroxide and 7-chloro-4-hydroxy-5-indancarboxylic acid, Tetramethyl ammonium 4-acetoxy-5-indancarboxylate by reacting equivalent quantities of tetramethyl ammonium hydroxide and 4-acetoxy-5-indancarboxylic acid, Lead 4-methoxy-5-indancarboxylate by reacting equivalent quantities of lead (II) hydroxide and 4-methoxy-5-indancarboxylic acid, and the N-methylglucamine salt of 7-chloro-4-hydroxy-5 - indancarboxylic acid by reacting equivalent quantities of N-methylglucamine and 7-chloro-4-hydroxy-5 - indancarboxylic acid.

What is claimed is:
1. A compound of the formula

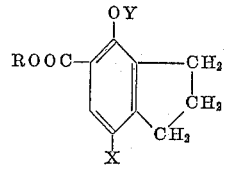

wherein Y is a member of the group consisting of hydrogen, lower-alkyl, and lower-alkanoyl; R is a member of the group consisting of hydrogen and lower-alkyl; and X is a member of the group consisting of hydrogen and halogen.

2. 4-lower-alkoxy-5-indancarboxylic acid.
3. 4-lower-alkanoyloxy-5-indancarboxylic acid.
4. 4-acetoxy-5-indancarboxylic acid.
5. 4-hydroxy-5-indancarboxylic acid.
6. Lower-alkyl 4-lower-alkoxy-5-indancarboxylate.
7. Lower-alkyl 4-lower-alkanoyloxy-5 - indancarboxylate.
8. Lower-alkyl 4-hydroxy-5-indancarboxylate.
9. Methyl 4-hydroxy-5-indancarboxylate.
10. 7-chloro-4-hydroxy-5-indancarboxylic acid.

References Cited by the Examiner

UNITED STATES PATENTS

| | | | |
|---|---|---|---|
| 2,078,625 | 4/37 | Zerweck et al. | 260—520 |
| 2,969,372 | 1/61 | Braun et al. | 260—310 |

OTHER REFERENCES

Hunsberger et al.: J. Am. Chem. Soc. 77, 2466–75 (1955).

LORRAINE A. WEINBERGER, *Primary Examiner.*

IRVING MARCUS, LEON ZITVER, *Examiners.*